United States Patent Office 3,492,565
Patented Jan. 27, 1970

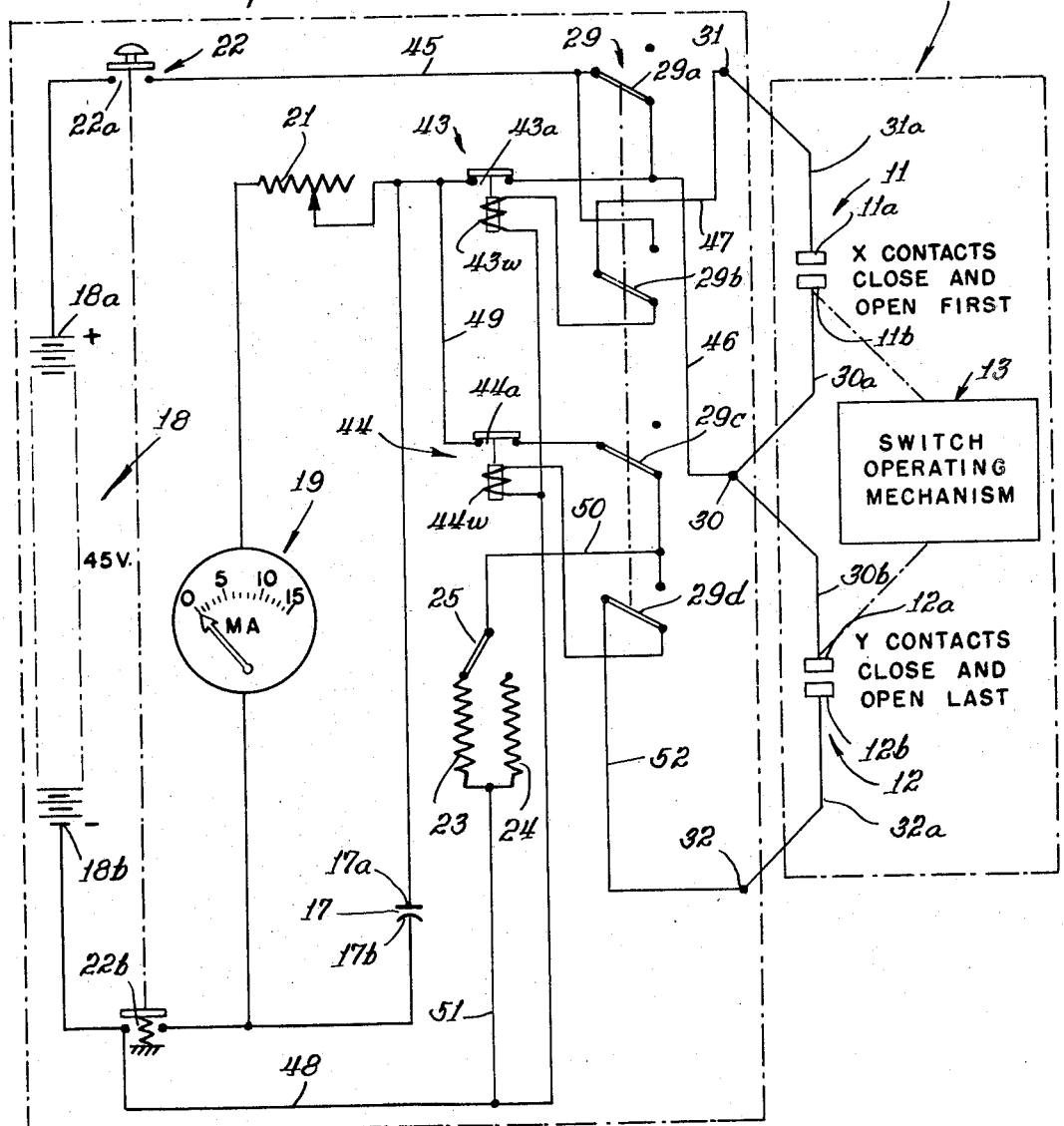

3,492,565
APPARATUS FOR MEASURING THE TIME INTERVAL BETWEEN OPENING OR CLOSING OF A PAIR OF SEQUENTIALLY OPERATED CONTACTS
Merlin C. Harman, Chicago, and Edwin W. Schmunk, Jr., Park Ridge, Ill., assignors to S & C Electric Company, Chicago, Ill., a corporation of Delaware
Filed Oct. 17, 1967, Ser. No. 675,874
Int. Cl. G01r 31/02, 11/00
U.S. Cl. 324—28    1 Claim

ABSTRACT OF THE DISCLOSURE

Apparatus for measuring the time interval between the operation of two sets of separable contacts by varying the charge on a capacitor associated with the sets of contacts. A transfer switch means shifts the connections between a battery and the capacitor such that the time interval can be measured for either sequential openings or sequential closures.

---

Figure 1:
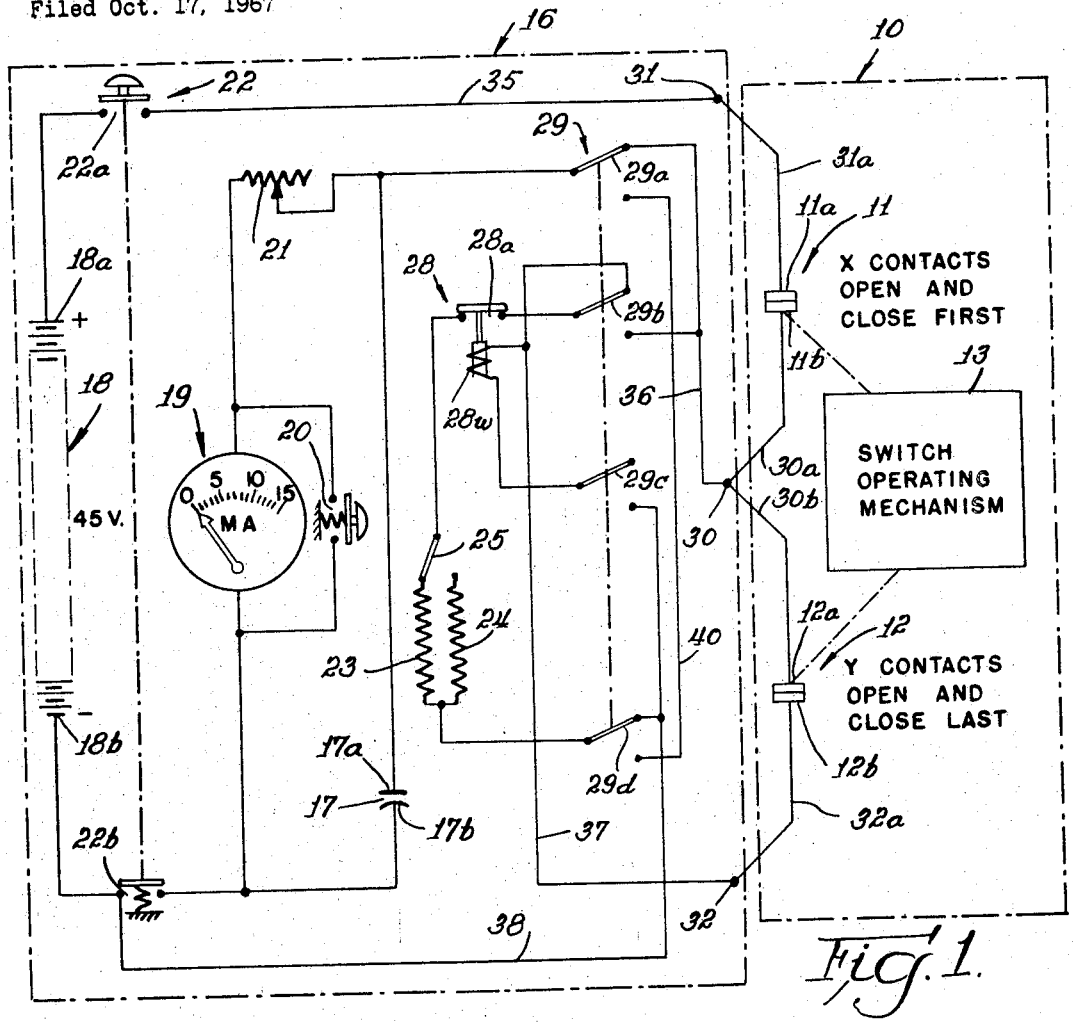

Among the objects of this invention are: To provide for measuring the time interval between the opening or closing of two sets of separable contacts which are intended to be opened and closed substantially simultaneously or in predetermied sequence; to accomplish this by varying the charge on a capacitor; to provide an indication of the change in the charge on the capacitor; to connect the two sets of separable contacts in series and to the capacitor in such manner that it is discharged on sequential opening of the separable contacts to an extent depending upon the time interval between the opening of one set of the separable contacts and the opening of the other set and is charged on sequential closing of the separable contacts to an extent depending upon the time interval between the closing of one set of the separable contacts and the closing of the other set; to connect the two sets of separable contacts in series and to the capacitor in such manner that it is discharged on sequential closing of the separable contacts to an extent depending upon the time interval between closing of one set of the separable contacts and the closing of the other set; to initiate manually the charging or discharging of the capacitor; to shift the connection to the capacitor from the sets of separable contacts depending upon whether they are to be opened or closed; and to provide for different rates of changing the charge on the capacitor.

The time interval measuring apparatus herein disclosed can be employed in conjunction with the switch construction of Evans et al. application Ser. No. 651,565, filed July 6, 1967, now Patent No. 3,432,780. A three phase high voltage switch is there disclosed which includes in each phase series connected load current interrupters or separable contacts in series with a disconnecting switch together with common operating mechanism intended to open or close the contacts substantially simultaneously. The reason for the substantially simultaneous opening or closing of the contacts in each phase is to reduce to a minimum the disturbance of an electrical power system that is energized or deenergized on operation of the three phase switch. Using the present invention, the separable contacts of two of the three phases are connected in series and they are opened and closed to determine the time interval for each operation. These operations are progressively repeated for all pairs of phases until each phase has been checked out against each of the others. Suitable adjustments are made in the linkages between the common operating mechanism and the sets of separable contacts for the three phases to achieve as nearly as possible simultaneity of opening and closing of all of the contacts.

According to this invention two sets of contacts that are intended to be opened and closed substantially simultaneously are connected in a series circuit relation. A capacitor is arranged to be connected to these sets of series connected contacts and to have the charge thereon from a source of direct voltage changed according to the time interval between the opening of one of the two sets of contacts and the subsequent opening of the other set or according to the time interval between the closing of one of the two sets of contacts and the subsequent closing of the other set. An indicating meter is connected across the capacitor to measure its charge. The capacitor is discharged through a resistor to determine the time interval between the opening of the two sets of separable contacts and is charged through this resistor to determine the time interval between the closing of the two sets of separable contacts. In a modification the capacitor is discharged through the resistor to determine the time interval between the closing of the two sets of separable contacts and is charged to determine the time interval between the opening of the two sets of separable contacts. A transfer switch is employed to condition the capacitor for being discharged or charged, depending upon whether the two sets of separable contacts are to be opened or closed for the time interval measurement.

Figure 2:
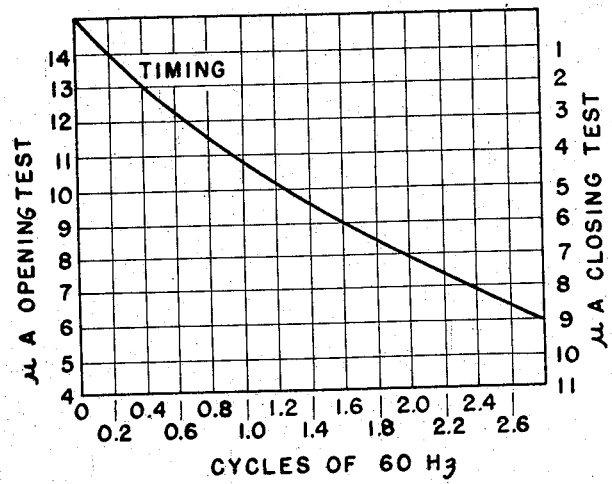

In the drawings: FIG. 1 illustrates, diagrammatically, the circuit connections that can be employed for using the discharge of the capacitor to determine the time interval between the sequential opening of series connected separable contacts and the charge on the capacitor for determining the time interval between sequential closing of these contacts. FIG. 2 shows a curve that illustrates the rate of charge and discharge of the capacitor. FIG. 3 illustrates, diagrammatically, the circuit connections that can be employed for measuring the discharge of the capacitor on sequential closing of the separable contacts to determine the time interval therebetween.

Referring now to FIG. 1, the reference character 10 designates generally, a polyphase interrupter. Specifically the circuit interrupter 10 includes a first set of separable contacts that are indicated, generally, at 11 and a second set of separable contacts that are indicated, generally, at 12. The individual separable contacts are indicated at 11a–11b and 12a–12b. A switch operating mechanism, indicated generally at 13, is arranged to effect the opening or the closing of the sets 11 and 12 of separable contacts. In some cases a separate operating mechanism 13 is employed for each phase and provision is made for operating such individual mechanisms simultaneously or in predetermined sequence.

The polyphase circuit interrupter 10 ordinarily is a three phase circuit interrupter and includes another set of separable contacts. For illustrative purposes the first and second sets of separable contacts 11 and 12 have been indicated as X and Y contacts. For a three phase circuit interrupter there is a set of Z contacts. However, in order to determine the time interval between the opening and closing of the separable contacts they are operated in sets of two, i.e., the time interval between the operation of the contacts in phase X and the contacts in phase Y. The operation is repeated for the contacts in phase X and Z and then for the contacts in phase Y and Z. Since the operations in each case are identical, only the separable contacts for phases X and Y are specifically illustrated and referred to herein.

There is indicated, generally, at 16 time interval measuring apparatus embodying this invention. This apparatus is mounted on a suitable panel and enclosed in a suitable portable case to provide a unitary portable construction. The time interval measuring apparatus 16 includes a capacitor 17 that is arranged to be charged from a direct voltage source that is indicated, generally, at 18. The direct voltage source 18 is preferably in the form of a battery having terminals 18a and 18b. For illustrative purposes the battery 18 may have a nominal voltage of 45 volts. For measuring the charge on the capacitor 17 a meter, indicated generally at 19, is employed. The meter 19 may be a microammeter and may be provided with a scale ranging from 0 to 15 microamperes. It will be understood that other meters calibrated otherwise can be employed. A switch 20 is provided for shunting the meter 19 to reduce the reading thereof to zero under certain circumstances. The meter 19 is connected across the capacitor 17 through a variable resistor 21 which is provided to adjust the initial capacitor charge.

For initiating operation of the time interval measuring apparatus 16 a manually operable switch means 22 is provided. The manually operable switch means 22 comprises normally open contacts 22a and 22b that are mechanically interconnected for simultaneous operation. The capacitor 17 is arranged to be charged or discharged under certain circumstances through either of two resistors 23 or 24 depending upon the position of a resistor transfer switch 25. The resistors 23 and 24 have different resistances in order to vary the charging or discharging rate of the capacitor 17. For example, the resistor 24 may have a resistance five times that of the resistance of resistor 23.

For opening the charging circuit to the capacitor 17 through either the resistor 23 or the resistor 24 when the time interval between the closing of the separable contacts 11 and 12 is to be measured, a relay, shown generally at 28, is employed. The relay 28 includes normally closed contacts 28a and an energizing winding 28w. Provision is made for connecting the energizing winding 28w across the direct voltage source 18 on closure of the first set of separable contacts 11 to terminate the charging of the capacitor 17.

Since different circuit connections are employed, depending upon whether the time interval between the opening or the closing of the sets of separable contacts 11 and 12 is to be measured, a circuit transfer switch means, indicated generally at 29, is employed. The circuit transfer switch means 29 includes four transfer switch elements 29a, 29b, 29c and 29d which are single pole double throw switches that are commonly interconnected mechanically for conjoint operation from one position to the other position. They are shown in the position that they occupy when the time interval between the opening of the first and second sets of separable contacts 11 and 12 is to be measured.

External connections to the circuitry of the time interval measuring apparatus 16 is facilitated by the provision of connecting terminals 30, 31 and 32. The terminal 30 is connected by conductors 30a and 30b to contacts 11a and 12a, respectively, of the first and second sets of separable contacts 11 and 12. This places these sets of separable contacts in series circuit relation. Conductor 31a interconnects terminal 31 and separable contact 11b while conductor 32a interconnects terminal 32 and separable contact 12b.

In describing the operation of the time interval measuring apparatus 16, it will be assumed that it is connected as illustrated in FIG. 1 with the resistor transfer switch 25 in the position to place the resistor 23 in circuit and with the circuit transfer switch means 29 in the position illustrated for measuring the interval between the opening of the first set of separable contacts 11 and the opening of the second set of separable contacts 12. To initiate the time interval measurement the manually operable switch means 22 is closed. A circuit is completed for charging capacitor 17 which can be traced from terminal 18a of the direct voltage source 18 through contacts 22a, conductors 35 and 31a, closed first set of separable contacts 11, conductors 30a and 36, transfer switch element 29a, capacitor 17 and contacts 22b to the terminal 18b of the direct voltage source 18. The variable resistor 21 is adjusted so that the meter 19 reads full scale. Next the switch operating mechanism 13 is operated for effecting the opening of the first and second sets of separable contacts 11 and 12. It is assumed that the first set of separable contacts 11 opens before the second set of separable contacts 12. If this is not the case, it will be manifested by no change in the reading of meter 19. The connections then are interchanged to obtain this sequence of operation. As soon as separable contacts 11 are opened, the previously traced charging circuit for the capacitor 17 is opened and it starts to discharge over a circuit that can be traced from capacitor terminal 17a through transfer switch element 29, conductors 36 and 30b, second set of separable contacts 12, conductors 32a and 37, transfer switch element 29b, closed contacts 28a, resistor transfer switch 25, resistor 23, transfer switch element 29d, conductor 38, closed contacts 22b to terminal 17b of the capacitor 17. As soon as the second set of separable contacts 12 opens, the discharge circuit just traced is opened and the charge remaining on the capacitor 17 can be determined by inspection of the meter 19. The change in reading of the meter 19 is a measurement of the time interval between the opening of the first set of separable contacts 11 and the opening of the second set of separable contacts 12.

FIG. 2 contains curve 38 which is typical of the rate at which the capacitor 17 is discharged or charged with the ordinates at the left side of the chart representing discharge and the ordinates at the right side of the chart representing charge while the abscissae indicates time in cycles of 60 Hz. Under the conditions assumed above cycles of 60 Hz. Under the conditions assumed above with the meter 19 reading full scale or 15 microamperes, then the reading of the meter 19 after opening of the second set of separable contacts 12 can be translated to cycles of 60 Hz. by reference to the scale at the bottom of the chart. Preferably the arrangement is such that there is less than one cycle of 60 Hz. between the opening of the first set of separable contacts 11 and the opening of the second set of separable contacts 12. Specifically then the meter 19 would change from a reading at 15 to a reading at 11 for optimum practical operation. Where the system is operated using the resistor 24, the discharge rate would be correspondingly longer and it would be possible to measure a correspondingly longer time interval between the opening of the first set of separable contacts 11 and the opening of the second set of separatble contacts 12.

For determining the time interval between the closing of the first set of separable contacts 11 and the closing of the second set of separable contacts 12 the circuit transfer switch means 29 is operated to the alternate position. This assumes that separable contacts 11 and 12 are open and that the manually operable switch means 22 is in the open position. The short circuiting switch 20 is momentarily depressed to return the meter 19 to the zero position. It will also be assumed that the resistor transfer switch 25 is in the position shown with the resistor 23 connected in the circuit. On closure of the manually operable switch means 22, no action takes place since, under the assumed conditions, the first set of separable contacts 11 is open. With the manually operable switch means 22 in the closed position the switch operating mechanism 13 is operated and the first set of separable contacts 11 is closed. This completes the charging circuit for the capacitor 17. It can be traced from terminal 18a of the direct voltage source 18 through contacts 22a, conductors 35 and 31a, first set of separable contacts 11, conductors 30a and 36, transfer switch element 29b in the alternate position, contacts 28a, resistor transfer switch 25, resistor 23, transfer switch element 29d in the alternate position, conductor 40, transfer switch element 29a in the alternate position, capacitor 17, and contacts 22b to terminal 18b of the direct voltage source 18. The capacitor 17 continues to be charged and the charge on it is indicated by the meter 19 until the charging circuit is opened by the closure of the second set of separable contacts 12. A circuit then is completed for energizing winding 28w of the relay 28 which can be traced from terminal 18a of the direct voltage source 18 through contacts 22a, conductors 35 and 31a, closed first set of separable contacts 11, closed second set of separable contacts 12, conductors 32a and 37, winding 28w, transfer element 29c in the alternate position and conductor 38 to terminal 18b of the direct voltage source 18. On opening of contacts 28a the charging circuit for the capacitor 17 is opened and the reading of the meter 19 then referred to curve 29 gives the time in cycles of 60 Hz. between the closing of the first set of separable contacts 11 and the closing of the second set of separable contacts 12. The manually operable switch means 22 then is restored to the open circuit position.

In FIG. 3 the time interval measuring apparatus, indicated generally at 16′, is similar to the time interval measuring apparatus 16 shown in FIG. 1 and described hereinbefore. Insofar as possible the same reference characters are applied to the same circuit elements. The time interval measuring apparatus 16′ is arranged to operate in reverse of the operation for the time interval measuring apparatus shown in FIG. 1 with respect to measurement of the time interval between the closing of the first set of separable contacts 11 and the closing of the second set of separable contacts 12. More specifically, the charge on the capacitor 17 is discharged for measuring this time interval rather than being charged as described above and vice versa. An important difference in the circuits comprises the provision of first and second relays indicated, respectively, at 43 and 44 and each including normally closed contacts 43a and 44a and an energizing windnig 43w and 44w.

In describing the operation of the time interval measuring apparatus 16′ it will be assumed that a resistor transfer switch 25 is in the position to place the resistor 23 in the circuit and that the circuit transfer switch means 29 is positioned as illustrated. Also it will be assumed that the connections to the first and second sets of separable contacts 11 and 12 are completed as shown. The manually operable switch means 22 is closed and a circuit then is completed for charging capacitor 17 which can be traced from terminal 18a of the direct voltage source 18 through contacts 22a, conductor 45, transfer switch element 29a, closed contacts 43a, capacitor 17, contacts 22b to terminal 18b of the direct voltage source 18. Resistor 21 is adjusted so that the meter 19 reads full scale. With the manually operable switch means 22 remaining in the closed position, the switch operating mechanism 13 is operated and, as assumed above, the first set of separable contacts 11 closes first to complete a circuit for energizing winding 43w. This circuit can be traced from terminal 18a of the direct voltage source 18 through contacts 22a, conductor 45, transfer switch element 29a, conductors 46 and 30a, first set of separable contacts 11, conductors 31a and 47, transfer switch element 29b, winding 43w, and conductor 48 to terminal 18b of the direct voltage source 18. Contacts 43a then are opened and the charging circuit to the capacitor 17, previously traced, is opened. Then the capacitor 17 begins to discharge over a circuit that can be traced from terminal 17a of capacitor 17 through conductor 49, contacts 44a, transfer switch element 29c, conductor 50, resistor transfer switch 25, resistor 23, conductors 51 and 48, contacts 22b to terminal 17b of capacitor 17. The capacitor 17 continues to discharge and meter 19 to read correspondingly until the second set of separable contacts 12 is closed whereupon an energizing circuit is completed for winding 44w which can be traced from terminal 18a of the direct voltage source 18, through contacts 22a, conductor 45, transfer switch element 29a, conductors 46 and 30b, second set of separable contacts 12, conductors 32a and 52, transfer switch element 29d, winding 44w, and conductor 48 to terminal 18 of the direct voltage source 18. Upon opening of contacts 44a the previously traced discharge circuit for the capacitor 17 is opened. The meter 19 then is read and the reading is used in conjunction with the curve 39 to determine the cycles of 60 Hz. required for the interval between the closing of the first set of separable contacts 11 and the closing of the second set of separable contacts 12.

For determining the interval between the opening of the contacts 11 and 12 using the system shown in FIG. 3, the transfer switch means 29 is operated to the alternate position. The manually operable switch means 22 is closed and the capacitor 17 is charged over an obvious circuit from the direct voltage source 18 through the first set of contacts 11. The resistor 21 is adjusted so that the meter 19 reads full scale. Mechanism 13 then is operated and contacts 11 are opened to open the charging circuit for the capacitor 17 and it discharges over an obvious circuit through contacts 12 until they open. The loss of charge on the capacitor 17, as reflected by the reading of meter 19 and related to the curve 39 on the chart in FIG. 2, indicates the interval between the opening of contacts 11 and 12.

What is claimed as new is:

1. Apparatus for measuring the time interval between the operation of first and second sets of separable contacts which are intended to be opened and closed in predetermined sequence comprising
   a capacitor,
   a direct voltage source,
   first circuit means for connecting one terminal of said capacitor to one contact of each of said sets of contacts,
   second circuit means for connecting the other contact of said second set of contacts to one terminal of said direct voltage source,
   switch means for interconnecting the terminals of said direct voltage source, said capacitor and said sets of contacts whereby on sequential operation of said sets of separable contacts the charge on said capacitor from said direct voltage source is changed with the change being a measure of said time interval, and
   transfer switch means for shifting the connections between said capacitor and said direct voltage source such that when staid sets of separable contacts are closed with said transfer switch means in one position and said switch means is operated, said capacitor is charged and, on sequential opening of said sets of separable contacts, said capacitor is discharged to an extent depending upon the time interval between the opening of said first set of separable contacts and the opening of said second set of separable contacts, and such that when said sets of separable contacts are open with said transfer switch in an alternate position and said switch means is operated, said capacitor is charged on sequential closing of said sets of separable contacts to an extent depending upon the time interval between the closing of said first set of separable contacts and the closing of said second set of separable contacts.

References Cited

UNITED STATES PATENTS

| | | | |
|---|---|---|---|
| 2,177,569 | 10/1939 | Jorgensen | 324—68 XR |
| 2,933,681 | 4/1960 | Crain | 324—68 |
| 3,416,079 | 12/1968 | Burger | 324—68 |

ARCHIE R. BORCHELT, Primary Examiner

E. L. STOLARUN, Assistant Examiner

U.S. Cl. X.R.

324—68